United States Patent
Chen et al.

(10) Patent No.: US 7,602,684 B2
(45) Date of Patent: Oct. 13, 2009

(54) DISCRIMINATING METHOD OF AN OPTICAL DISC DEVICE FOR ASCERTAINING THE FORMAT OF A LOADED OPTICAL DISC

(76) Inventors: Chun-Ta Chen, 8F., No. 533, Chung-Cheng Rd., Hsin-Tien, Taipei (TW); Sheng-Hsien Yen, 8F., No. 533, Chung-Cheng Rd., Hsien-Tien, Taipei (TW)

( * ) Notice: Subject to any disclaimer, the term of this patent is extended or adjusted under 35 U.S.C. 154(b) by 579 days.

(21) Appl. No.: 10/940,656

(22) Filed: Sep. 15, 2004

(65) Prior Publication Data

US 2005/0058036 A1    Mar. 17, 2005

Related U.S. Application Data

(60) Provisional application No. 60/502,654, filed on Sep. 15, 2003.

(51) Int. Cl.
*G11B 7/00* (2006.01)
(52) U.S. Cl. .................. 369/53.22; 369/53.23
(58) Field of Classification Search ............... 369/53.2, 369/53.22, 53.23
See application file for complete search history.

(56) References Cited

U.S. PATENT DOCUMENTS

| | | | |
|---|---|---|---|
| 5,003,521 A * | 3/1991 | Yoshida et al. | 369/44.25 |
| 5,381,392 A | 1/1995 | Hira et al. | |
| 5,506,824 A | 4/1996 | Fairchild et al. | |
| 5,724,325 A | 3/1998 | Jeong et al. | |
| 5,745,460 A | 4/1998 | Tateishi et al. | |
| 5,764,610 A | 6/1998 | Yoshida et al. | |
| 5,831,952 A | 11/1998 | Yamada et al. | |
| 5,903,531 A | 5/1999 | Satoh et al. | |
| 5,917,791 A * | 6/1999 | Tsuchiya et al. | 369/53.23 |
| 5,959,955 A | 9/1999 | Choi et al. | |
| 6,005,832 A | 12/1999 | Kumagai et al. | |
| 6,052,344 A * | 4/2000 | Ueki | 369/44.27 |

(Continued)

FOREIGN PATENT DOCUMENTS

BR    P10418819    11/2007

(Continued)

OTHER PUBLICATIONS

Search and Examination Report for GB Application No. 0324645.0, Mail Date Nov. 22, 2004, 8 pages.

(Continued)

*Primary Examiner*—Wayne R Young
*Assistant Examiner*—Linh T Nguyen
(74) *Attorney, Agent, or Firm*—Perkins Cole LLP

(57) ABSTRACT

A discriminating method of ascertaining the format of the loaded optical disc for an optical disc device is disclosed. When the optical disc device operates under a close-loop control, related central error signal is amplified and measured, while the peak-to-peak value of the amplified central error signal is then compared with a threshold. The loaded optical disc will be discriminated as a R-type medium if the peak-to-peak value of the amplified central error signal is larger than the threshold. On the contrary, the loaded optical disc is identified as a ROM-type medium if the peak-to-peak value of the amplified central error signal is smaller than the threshold.

14 Claims, 3 Drawing Sheets

U.S. PATENT DOCUMENTS

| | | |
|---|---|---|
| 6,212,141 B1 | 4/2001 | Tanikawa et al. |
| 6,249,499 B1 | 6/2001 | Andoh et al. |
| 6,295,260 B1 * | 9/2001 | Shihara et al. ............. 369/53.2 |
| 6,449,232 B1 | 9/2002 | Kuwahara et al. |
| 6,459,666 B1 | 10/2002 | Yokoi |
| 6,603,720 B1 | 8/2003 | Kuroda et al. |
| 6,700,847 B2 | 3/2004 | Osada |
| 6,728,181 B2 | 4/2004 | Shimoda et al. |
| 6,747,931 B1 * | 6/2004 | Park ........................ 369/53.23 |
| 6,760,289 B1 * | 7/2004 | Ide ............................ 369/53.2 |
| 6,807,136 B1 | 10/2004 | Grimm et al. |
| 6,816,443 B1 | 11/2004 | Hwang et al. |
| 6,822,936 B2 | 11/2004 | Ono et al. |
| 6,856,586 B2 | 2/2005 | Usui et al. |
| 6,909,678 B2 | 6/2005 | Morishima et al. |
| 6,925,039 B2 | 8/2005 | Yanagawa et al. |
| 6,980,500 B2 | 12/2005 | Lu et al. |
| 6,992,961 B2 | 1/2006 | Minase et al. |
| 7,016,284 B2 | 3/2006 | Chou |
| 7,046,593 B2 | 5/2006 | Ito |
| 7,099,253 B2 | 8/2006 | Hsu et al. |
| 7,136,340 B2 | 11/2006 | Ide et al. |
| 2002/0015017 A1 | 2/2002 | Kwag |
| 2002/0075780 A1 | 6/2002 | Ogihara |
| 2002/0126607 A1 | 9/2002 | Yamamoto et al. |
| 2002/0150017 A1 * | 10/2002 | Ono et al. ................. 369/53.23 |
| 2003/0099171 A1 * | 5/2003 | Ito .......................... 369/44.32 |
| 2004/0081049 A1 | 4/2004 | Chan |
| 2004/0130986 A1 * | 7/2004 | Minase et al. ............ 369/47.39 |
| 2004/0218497 A1 | 11/2004 | Choi et al. |
| 2005/0047300 A1 | 3/2005 | Ono et al. |
| 2005/0058036 A1 | 3/2005 | Chen et al. |
| 2005/0105433 A1 * | 5/2005 | Juan et al. ................ 369/53.23 |
| 2005/0226114 A1 | 10/2005 | Liow et al. |
| 2005/0265187 A1 | 12/2005 | Chang et al. |
| 2005/0265188 A1 | 12/2005 | Chang et al. |
| 2006/0198268 A1 | 9/2006 | Chan |

FOREIGN PATENT DOCUMENTS

| | | |
|---|---|---|
| BR | P10418821 | 11/2007 |
| CN | 1348181 | 5/2002 |
| CN | 1366660 | 8/2002 |
| CN | 1490790 | 4/2004 |
| CN | 1591643 | 3/2005 |
| CN | 1601639 | 3/2005 |
| CN | 1637909 | 7/2005 |
| CN | 1658312 | 8/2005 |
| CN | 1700311 | 11/2005 |
| DE | 10349161 | 6/2004 |
| EP | 0725395 | 6/1996 |
| EP | 0784321 | 7/1997 |
| EP | 0811971 | 12/1997 |
| EP | 0813192 | 12/1997 |
| EP | 0903735 | 3/1999 |
| GB | 2394596 | 4/2004 |
| JP | 10302381 | 11/1998 |
| JP | 2000078392 | 3/2000 |
| JP | 2000315355 | 11/2000 |
| JP | 2000322742 | 11/2000 |
| JP | 2001126376 | 5/2001 |
| JP | 2001167510 | 6/2001 |
| JP | 2001265620 | 9/2001 |
| JP | 2002007156 | 1/2002 |
| JP | 2002312933 | 10/2002 |
| JP | 2003016441 | 1/2003 |
| JP | 2003078392 | 3/2003 |
| JP | 2003217135 | 7/2003 |
| TW | 200511273 | 3/2005 |
| TW | 253060 | 4/2006 |
| TW | 1298156 | 6/2008 |
| WO | WO-03005350 | 1/2003 |
| WO | WO-2005117008 | 12/2005 |
| WO | WO-2005117009 | 12/2005 |

OTHER PUBLICATIONS

Search and Examination Report for GB Application No. 0324645.1, Mail Date Feb. 9, 2004, 1 page.

German Search Report for German Application No. 10349161.9, Mail Date Nov. 17, 2004, 2 pages.

* cited by examiner

DISCRIMINATING METHOD OF AN OPTICAL DISC DEVICE FOR ASCERTAINING THE FORMAT OF A LOADED OPTICAL DISC

BACKGROUND OF THE INVENTION

1. Field of the Invention

The present invention relates to a discriminating method of an optical disc device for ascertaining a loaded optical disc, and more particularly relates to a method for discriminating the format of a R-type and ROM-type medium for the optical disc device.

2. Description of the Prior Art

The conventional procedure for reading data recorded on an optical disc includes the following steps. Firstly, referring to FIG. 1, a light beam radiated from a light source 101 is guided and reflected by a beam splitter 107 and a mirror 109, and then penetrates a lens 111 to project onto the loaded optical disc 103. Thereafter, a reflected light beam, which sequentially penetrating the lens 111, reflected by the mirror 109, and penetrating the beam splitter 107, is finally detected by a photodetector 105 and then converted into several detection signals. In this so-called "Disc ID" step of conventional approach, the structure of the loaded optical disc could be identified as a CD or DVD, or as single-layer or a dual-layer according to a focusing error (FE) signal derived from the detection signals. In this regard, referring to FIG. 2A and FIG. 2B, if there is only one s-curve such as the waveform 201 of FIG. 2A shown in the detected focusing error signal, the structure of the loaded optical disc 103 could be identified as a single-layer. On the other hand, the loaded optical disc 103 could be identified as a dual-layer structure if there are two s-curves as the waveform 203 of FIG. 2B being detected in the focusing error signal. On the other hand, the optical disc device might recognize the loaded disc as a CD or DVD by means of the waveforms of s-curves since the distance between the reflection layer and data layer of CD is usually larger than that of the DVD. However, the optical disc device does not recognize the loaded one is a R-type or ROM-type medium only by using s-curves. Thereafter, the optical disc device performs a focus-on procedure under a close-loop control, while all parameters for reading disc (e.g., equalizing parameter) are adjusted according to requirements of the currently loaded disc during a calibrating procedure. A default disc structure, e.g. a DVD-R or a DVD-ROM, is assumed for the currently loaded optical disc at the beginning of the calibrating procedure because the actual disc format is still unknown until the lead-in area of the loaded one is correctly accessed during the calibrating procedure. Thereafter, the optical disc device may fetch the recorded data from the loaded optical disc after recognizing actual disc format. It is obvious a time-cost way for the conventional calibrating procedure to fetch the recorded data correctly since the actual format of the loaded optical disc cannot be recognized immediately.

A discriminating method is necessary for the optical disc device to ascertain the format of the loaded optical disc quickly, and more particularly to distinguishing the format between the R-type and ROM-type medium.

SUMMARY

Accordingly, a discriminating method of ascertaining the format of the loaded optical disc for an optical disc device is disclosed. With detection signals from the focus-on procedure, the format of the loaded optical disc can be identified by eliminating the time delay caused by recognizing the disc format by means of the lead-in area of the loaded one.

According to the above objects, the present invention provides a discriminating method for an optical disc device to ascertain the format of the loaded optical disc as a R-type or ROM-type medium by detecting a central error signal when the optical disc device operates under the close-loop control. A threshold is used to distinguish the currently loaded disc is a R-type or ROM-type medium after the central error signal being amplified. The loaded optical disc is recognized as a R-type medium when the peak-to-peak value of the amplified central error signal is substantially larger than the threshold. However, the loaded one is recognized as a ROM-type medium when the peak-to-peak value of the amplified central error signal is smaller than the threshold.

In an embodiment, the amplification rate of the central error signal is determined as the physical characteristics of the optical pickup unit mounted in the optical disc device.

In an embodiment, the ROM-type medium is a DVD-ROM or CD-ROM.

In an embodiment, the R-type medium is a DVD-R or a CD-R.

The detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

DESCRIPTION OF THE PREFERRED EMBODIMENT

Figure 1:
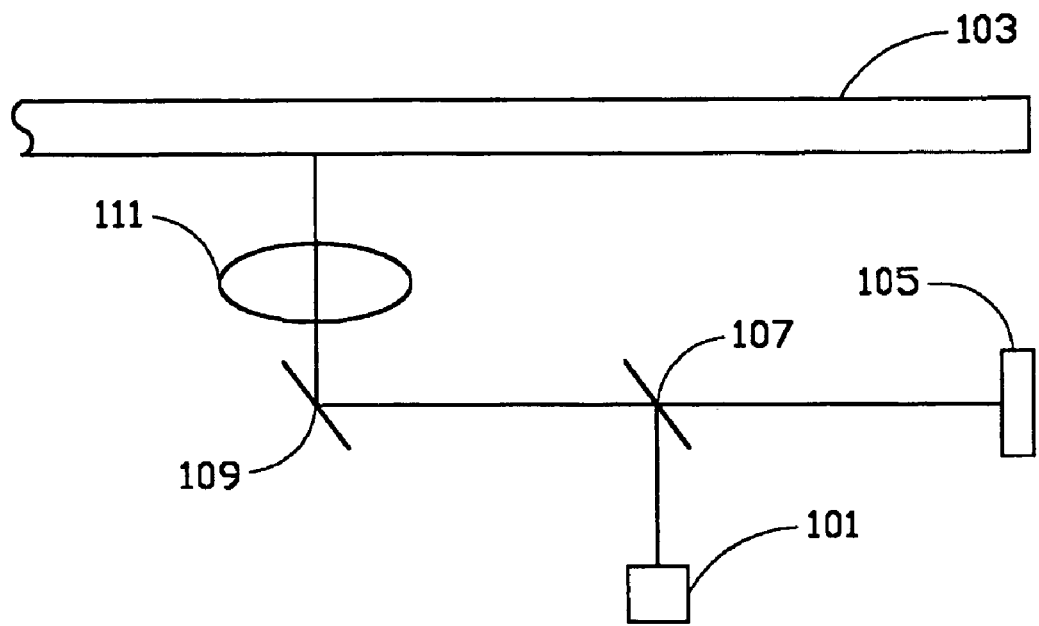
FIG. 1 illustrates the configuration of the light source, the loaded optical disc, beam splitter, mirror, lens, and the photodetector.
Figure 2A:
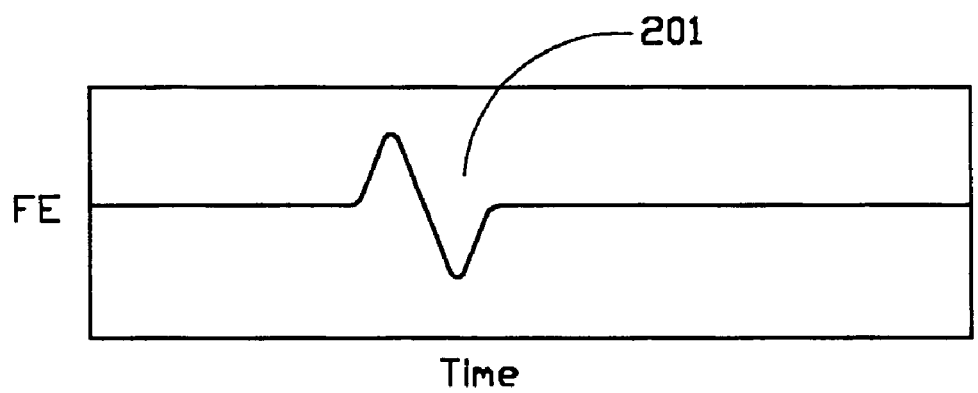
FIGS. 2A and 2B illustrate exemplary profiles of the focusing error signal.
Figure 2B:
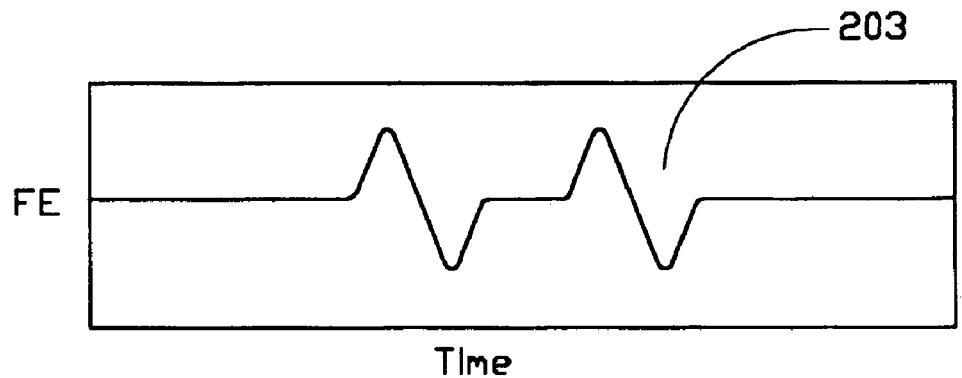
Figure 3:
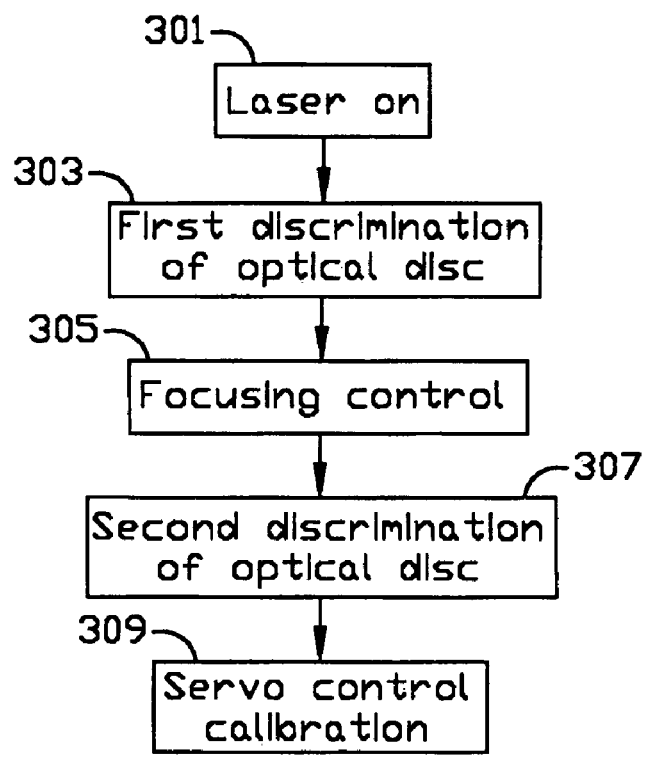
FIG. 3 illustrates a flow chart of an optical disc device to ascertain the format of a loaded optical disc according to a discriminating method of the present invention.

FIG. 3 shows a flow chart of an optical disc device to ascertain the format of a loaded optical disc according to a discriminating method of the present invention. In one preferred embodiment, the discriminating method performed by an optical disc device is to discriminate, but not limited to, the format of optical discs between R-type medium (e.g., DVD-R or CD-R) and ROM-type medium (DVD-ROM or CD-ROM). First, a laser beam radiated from a light source, such as a laser diode, is incident onto an loaded optical disc and derives a reflected beam (step 301). The reflected light beam is detected by a photodetector and then processed by related integrated circuits of the optical disc device to produce several detection signals. These detection signals includes, but not limited to, a tracking error (TE) signal, a focusing error or a central error (CE) signal. Typically, the so-called "Disc ID" step (step 303) is utilized to discriminate the structure of the optical disc as a single-layer or a dual-layer. A total of the detected s-curves is used for recognizing a signal- or dual-layer disc as mentioned in the background of the invention, while the focus-on procedure is then performed by the optical disc device (step 305). After a light spot is focused on the loaded optical disc by means of a close-loop control during the focus-on procedure, all parameters of servo control system are then calibrated according to requirements of the loaded disc (step of 309).

Figure 4A:
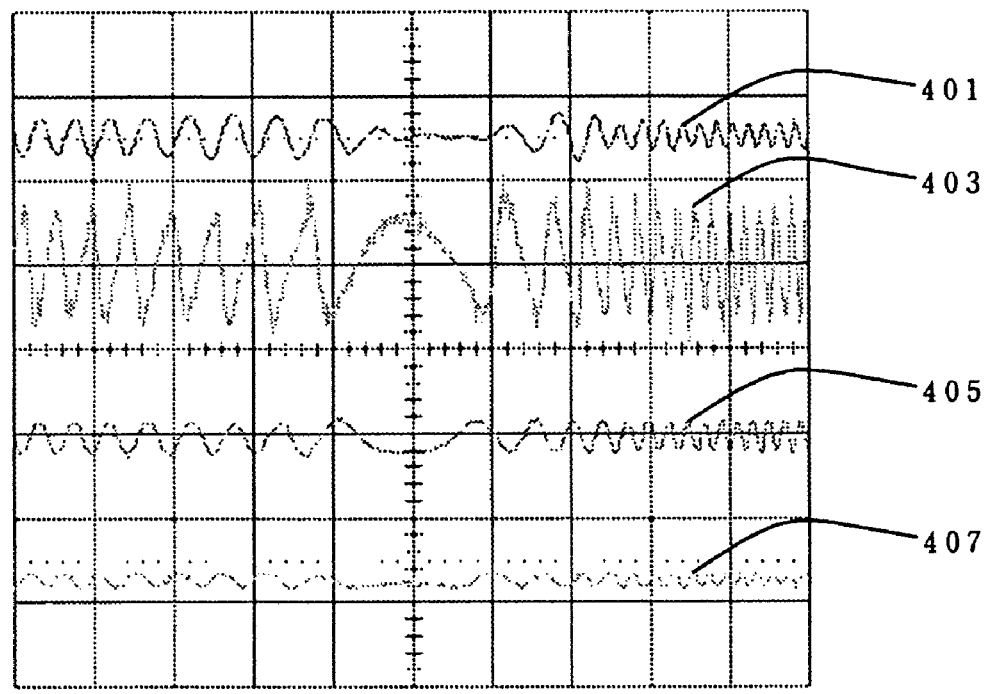
FIG. 4A and FIG. 4B illustrate exemplary waveforms of several detection signals derived during the focus-on procedure while DVD-R and DVD-ROM are loaded.
Figure 4B:
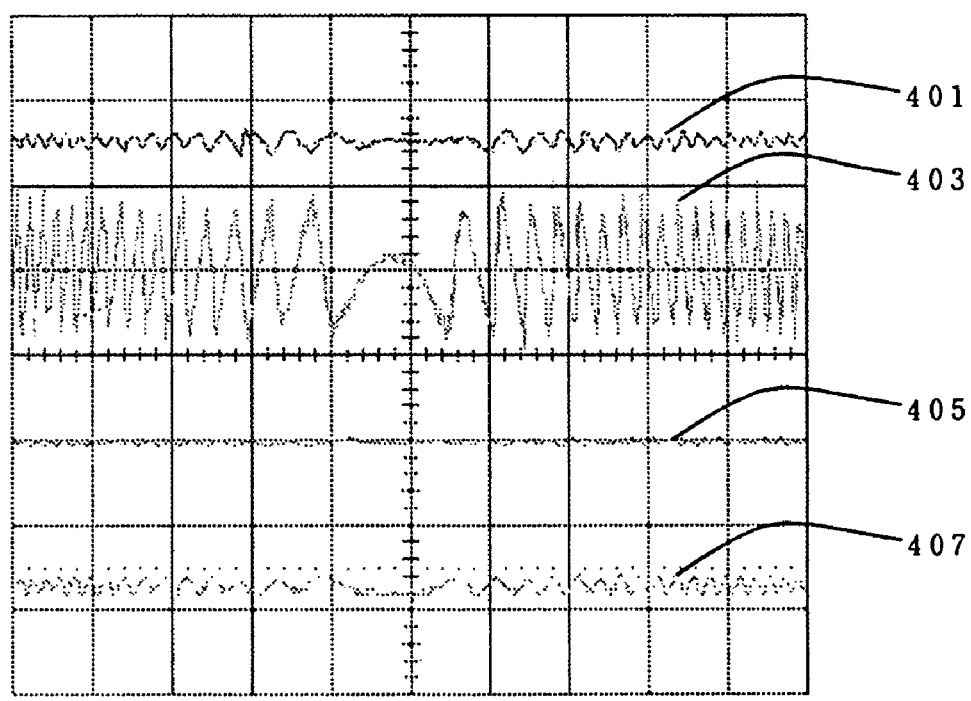

One feature of the present invention is to provide a second discrimination for recognizing the format of the loaded optical disc (step of 307) between the focus-on control step 305 and the servo calibration step 309. Please note that the light reflection rate of R-type medium is usually larger than that of ROM-type medium, which indicates that some detection signals might respond to this situation. Referring to FIGS. 4A-4B, exemplary waveforms of several detection signals—tracking error signal 401, focusing error signal 403, central error signal 405 and radio frequency level signal are derived during the focus-on procedure while DVD-R and DVD-ROM are loaded. As shown in FIGS. 4A-4B, it is obvious that the peak-to-peak value of the central error (CE) signal 405 of the DVD-R is larger than that of the DVD-ROM. Hence, the central error signal could be the best choice for discriminating R-type and ROM-type media as long as it is amplified properly. In the embodiment, the central error signal is amplified under 14.1831 dB; however, the amplification rate is different when different optical pickup unit is employed. Therefore, the peak-to-peak value of a central error signal is amplified and then measured when the optical disc device operates under the close-loop control. Referring to Table 1, five DVD-ROM discs (from disc 1 to disc 5) and six DVD-R discs (from disc 6 to disc 11) are experimented and tested several times (from Test 1 to Test 10), and each peak-to-peak value of the central error signal is amplified and listed below. Please note that the unit of Table is 15.625 mV (millivolt) such that the actual voltage level of every number in Table 1 can be obtained by multiplying 15.625 mV. For example, the peak-to-peak value of disc 1 during Test 1 is 22 units as shown in Table 1, which indicates that the amplified peak-to-peak value actually measured is:

22*15.625 mV=343.75 mV

It is obvious that, the average peak-to-peak value of the central error signal of the DVD-R discs should be larger than that of the DVD-ROM discs. Hence, through the above measuring and comparison procedures, the format of the loaded optical disc will be identified as a DVD-R or a DVD-ROM easily than before. For example, the threshold might be determined as 47 units (which is actually equal to 734.375 mV) in the embodiment. Thereafter, the loaded optical disc can be identified as a DVD-R when the amplified peak-to-peak value is larger than the predetermined 47 units. On the contrary, the loaded optical disc will be recognized as a DVD-ROM if the amplified peak-to-peak value is smaller than the predetermined 47 units. In implementation, the threshold could be determined by means of experiments on a plurality of R-type and ROM-type discs, while the threshold could be stored (or burned) in the optical disc device for discriminating the ROM-type and R-type medium in the future.

The present invention is not limited by only utilizing the central error signal to discriminate the format of the loaded optical disc between DVD-R and DVD-ROM. Other detection signals, such as radio frequency (RF) level signal, focusing error (Fe) signal and sub-beam add (SBAD) signal, will also be utilized to discriminate the format of the loaded optical disc. Additionally, the threshold could be predetermined as the physical characteristics of the optical pickup unit mounted in the optical disc device. Moreover, all kinds of optical disc devices that are capable of accessing or playing the contents recorded on an optical disc may employ the disclosed method to discriminate the current loaded optical disc is a R-type or ROM-type medium. Those optical disc devices include, but are not limited to CD-ROM drives, CD-RW drives, DVD-ROM drives, DVD-RW drives, Combo drives, DVD players, or even car audio/video drives, etc.

Skilled workers will further recognize that many changes may be made to the details of the above-described embodiments of this invention without departing from the underlying principles thereof. The scope of the present invention should, therefore, be determined only by the following claims.

What is claimed is:

1. A discrimination method executed by an optical disc device to discriminate a format of a loaded optical disc, the discrimination method comprising:
   providing a light beam onto the optical disc to generate a reflected light beam;
   generating a central error signal based at least in part on the generated reflected light beam;
   amplifying the central error signal to obtain a peak-to-peak value of the amplified central error signal;
   identifying the optical disc as a R-type medium if the amplified peak-to-peak value is larger than a specified threshold; and
   identifying the optical disc as a ROM-type medium if the amplified peak-to-peak value is smaller than the specified threshold, wherein only the central error signal is employed to discriminate the format of the loaded optical disc.

2. The discrimination method according to claim 1 wherein R-type medium comprises a DVD-R.

3. The discrimination method according to claim 1 wherein R-type medium comprises a CD-R.

4. The discrimination method according to claim 1 wherein ROM-type medium comprises a DVD-ROM.

5. The discrimination method according to claim 1 wherein ROM-type medium comprises a CD-ROM.

6. The discrimination method according to claim 1 wherein amplifying the central error signal includes determining an

TABLE 1

|  | DVD-ROM discs | | | | | DVD-R discs | | | | | |
| --- | --- | --- | --- | --- | --- | --- | --- | --- | --- | --- | --- |
|  | disc 1 | disc 2 | disc 3 | disc 4 | disc 5 | disc 6 | disc 7 | disc 8 | disc 9 | disc 10 | disc 11 |
| Test 1 | 22 | 34 | 31 | 27 | 13 | 60 | 60 | 63 | 59 | 60 | 63 |
| Test 2 | 21 | 30 | 35 | 26 | 11 | 63 | 61 | 65 | 57 | 59 | 61 |
| Test 3 | 22 | 36 | 33 | 26 | 14 | 62 | 62 | 64 | 58 | 57 | 60 |
| Test 4 | 20 | 36 | 33 | 26 | 15 | 60 | 61 | 62 | 60 | 62 | 63 |
| Test 5 | 17 | 32 | 33 | 26 | 15 | 62 | 61 | 62 | 61 | 61 | 63 |
| Test 6 | 24 | 30 | 34 | 28 | 12 | 62 | 63 | 61 | 59 | 62 | 62 |
| Test 7 | 20 | 31 | 36 | 27 | 12 | 61 | 60 | 61 | 60 | 62 | 62 |
| Test 8 | 22 | 30 | 30 | 27 | 13 | 63 | 62 | 64 | 60 | 60 | 60 |
| Test 9 | 19 | 33 | 31 | 28 | 13 | 60 | 62 | 64 | 60 | 62 | 59 |
| Test 10 | 22 | 33 | 33 | 25 | 13 | 63 | 61 | 63 | 61 | 62 | 63 | amplification rate of the central error signal according to physical characteristics of an optical pickup unit mounted in the optical disc device.

7. A discrimination method executed by an optical disc device to discriminate the format of an loaded optical disc, the discrimination method comprising:

provide a light beam onto the optical disc to generate a reflected beam;

acquiring a central error signal based at least in part on the generated reflected beam;

amplifying the central error signal;

executing a focus-on procedure under a close-loop control to acquire a peak-to-peak value of the amplified central error signal;

comparing the peak-to-peak value of the amplified central error signal with a threshold;

identifying the optical disc as a R-type medium if the amplified peak-to-peak value is larger than the threshold; and identifying the optical disc as a ROM-type medium if the amplified peak-to-peak value is smaller than the threshold.

8. The discrimination method according to claim 7 wherein R-type medium is a DVD-R.

9. The discrimination method according to claim 7 wherein R-type medium comprises a CD-R.

10. The discrimination method according to claim 7 wherein ROM-type medium comprises a DVD-ROM.

11. The discrimination method according to claim 7 wherein ROM-type medium comprises a CD-ROM.

12. The discrimination method according to claim 7 wherein amplifying the central error signal includes determining an amplification rate of the central error signal according to physical characteristics of an optical pickup unit mounted in the optical disc device.

13. A device, comprising:

an optical disc device configured to access contents recorded on a loaded optical disc, the optical disc device operable to generate a central error signal based on a light beam reflected from the loaded optical disc, to amplify the central error signal, and to obtain a peak-to-peak value of the amplified central error signal, wherein the optical disc device identifies the loaded optical disc as R-type in response to the peak-to-peak value being greater than a threshold, and identifies the loaded optical disc as ROM-type in response to the peak-to-peak value being less than the threshold.

14. A method executed by an optical disc device, comprising:

providing a light beam onto an optical disc loaded into the optical disc device to generate a reflected light beam;

generating a sub-beam add signal using the reflected light beam;

amplifying the sub-beam add signal;

obtaining a peak-to-peak value of the amplified sub-beam add signal;

identifying the optical disc as a R-type medium if the amplified peak-to-peak value is larger than a threshold; and identifying the optical disc as a ROM-type medium if the amplified peak-to-peak value is smaller than the threshold.

\* \* \* \* \*

UNITED STATES PATENT AND TRADEMARK OFFICE
CERTIFICATE OF CORRECTION

PATENT NO.       : 7,602,684 B2                                Page 1 of 1
APPLICATION NO.  : 10/940656
DATED            : October 13, 2009
INVENTOR(S)      : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 953 days.

Signed and Sealed this

Fifth Day of October, 2010

David J. Kappos
*Director of the United States Patent and Trademark Office*